(12) United States Patent
Tsai et al.

(10) Patent No.: US 7,849,084 B2
(45) Date of Patent: Dec. 7, 2010

(54) METHOD AND SYSTEM FOR DYNAMIC EVENT MATCHING

(75) Inventors: Tse-Ming Tsai, Taipei County (TW); Chin-Cheng Wu, Taoyuan County (TW); Chun-Chieh Liao, Taipei County (TW)

(73) Assignee: Institute for Information Industry, Taipei (TW)

( * ) Notice: Subject to any disclaimer, the term of this patent is extended or adjusted under 35 U.S.C. 154(b) by 451 days.

(21) Appl. No.: 11/333,256

(22) Filed: Jan. 18, 2006

(65) Prior Publication Data

US 2007/0214460 A1  Sep. 13, 2007

(30) Foreign Application Priority Data

Oct. 27, 2005 (TW) .............................. 94137640 A

(51) Int. Cl.
*G06F 7/00* (2006.01)
*G06F 17/30* (2006.01)
(52) U.S. Cl. ................. 707/732; 707/736; 707/758
(58) Field of Classification Search ............ 707/721, 707/732, 733, 736, 758, 999.001, 999.002, 707/999.003, 999.101, 999.102, 999.103, 707/999.104
See application file for complete search history.

(56) References Cited

U.S. PATENT DOCUMENTS

| | | | | |
|---|---|---|---|---|
| 5,442,784 A | * | 8/1995 | Powers et al. ............... | 707/102 |
| 5,815,574 A | * | 9/1998 | Fortinsky ..................... | 713/153 |
| 5,848,415 A | * | 12/1998 | Guck ........................... | 707/10 |
| 6,691,106 B1 | * | 2/2004 | Sathyanarayan ............... | 707/3 |
| 6,735,568 B1 | * | 5/2004 | Buckwalter et al. ............ | 705/1 |
| 6,834,195 B2 | * | 12/2004 | Brandenberg et al. ..... | 455/456.3 |
| 6,839,730 B1 | * | 1/2005 | Ramabhadran ............. | 709/201 |
| 2004/0236865 A1 | * | 11/2004 | Ullman et al. .............. | 709/231 |
| 2004/0243663 A1 | * | 12/2004 | Johanson et al. ............ | 709/200 |
| 2004/0255025 A1 | * | 12/2004 | Ricagni ..................... | 709/224 |
| 2005/0038801 A1 | * | 2/2005 | Colrain et al. .............. | 707/100 |
| 2005/0165762 A1 | * | 7/2005 | Bishop ......................... | 707/3 |
| 2005/0216561 A1 | * | 9/2005 | Boies et al. ................. | 709/205 |

FOREIGN PATENT DOCUMENTS

WO  WO-9848366 A  * 10/1998

* cited by examiner

*Primary Examiner*—Vincent Boccio
(74) *Attorney, Agent, or Firm*—Birch, Stewart, Kolasch & Birch, LLP

(57) ABSTRACT

A method for dynamic event matching. A domain model for each domain is defined. Individual requirements and preferences of a user are modeled to create a personal model. Dynamic requirements of a specific domain for the user are modeled. A dynamic event is generated. The dynamic event is obtained using an information server for format transformation to create an event model. The personal model is matched with the event model using a content-based method according to the domain model and the dynamic event. The user is informed of the matching results. The matching results are adjusted according to user feedback.

16 Claims, 5 Drawing Sheets

METHOD AND SYSTEM FOR DYNAMIC EVENT MATCHING

BACKGROUND OF THE INVENTION

1. Field of the Invention

The present invention relates to data processing, and in particular relates to a method for dynamic event matching.

2. Description of the Related Art

Servers generate information according to relating settings and network events using event notification methods and actively or passively transmit the generated information to the client. Event notification methods are widely applied to network applications, comprising google alerts, electronic paper, on-line product recommendation systems, and others.

Google alerts are email updates of the latest relevant Google results (web, news, etc.) based on user choice of query or topic. Some handy uses of Google Alerts include monitoring a developing news story, keeping current on a competitor or industry, getting the latest on a celebrity or event, and keeping tabs on your favorite sports teams. Electronic paper is a channel-based notification technology, enabling users to receive specified information at a predetermined time. On-line product recommendation systems promote products by displaying recommended product lists using collaborative filtering, in which users and systems interact synchronously.

The advantages of event notification methods provide key word matching and active channel-based notification. A drawback of the method is the lack of semantic matching which may result in subscribers frequently not receiving desired information. Another drawback of on-line product recommendation systems is that responses to users are based on static preferences, thus systems can not respond dynamically.

U.S. Pat. No. 6,801,909 discloses "System and method for obtaining user preferences and providing user recommendations for unseen physical and information goods and services", which desires matching user preferences with data content to provide recommended information for users. The user preferences and data content are a multi-level, tree-like structure. A matching process for the disclosed method comprises content-based-filtering, collaborative filtering, event-based filtering, and context-based filtering. The disclosure describes replying to user questions based on a domain tree to generate user preferences. The user preferences are a subclass of the domain tree and indicate filtering and search conditions. The disclosure, however, does not provide the setting of dynamic requirement conditions.

Thus, as described, the invention discloses a method for dynamic event matching, providing semantic matching to send preferable content to subscribers.

BRIEF SUMMARY OF THE INVENTION

A method for dynamic event matching is provided. In an embodiment, a domain model for each domain is defined. Individual requirements and preferences of a user are modeled to create a personal model. Dynamic requirements of a specific domain for the user are modeled. A dynamic event is generated. The dynamic event is obtained using an information server for format transformation to create an event model. The personal model is matched with the event model using a content-based method according to the domain model and the dynamic event. The user is informed of the matching results. The matching results are adjusted according to user feedback.

A system for dynamic event matching is provided. The system comprises an event client, an event provider, and a broker. The event client creates a personal model according to individual requirements and preferences. The event provider generates a dynamic event. The broker models dynamic requirements of a specific domain for the event client, obtains the dynamic event from the event provider for format transformation to create an event model, matches the personal model and the event model using a content-based method according to a predefined domain model and the dynamic event, informs the user of the matching results, and adjusts the matching results according to user feedback.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention discloses a method and system for dynamic event matching.

Figure 1:
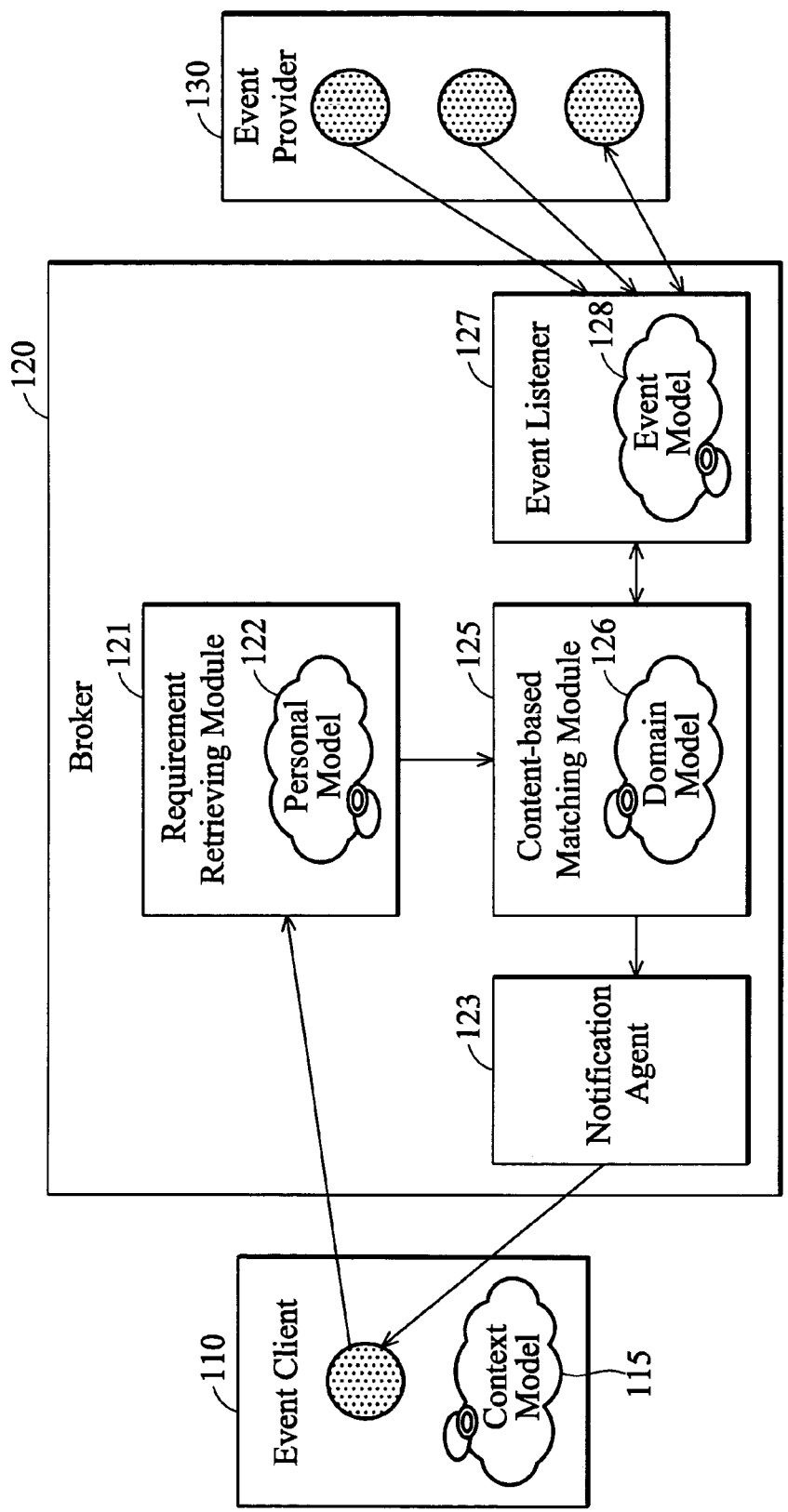
FIG. 1 is a schematic view of an embodiment of the architecture of a system for dynamic event matching.

FIG. 1 is a schematic view of an embodiment of the architecture of a system for dynamic event matching.

Figure 2:
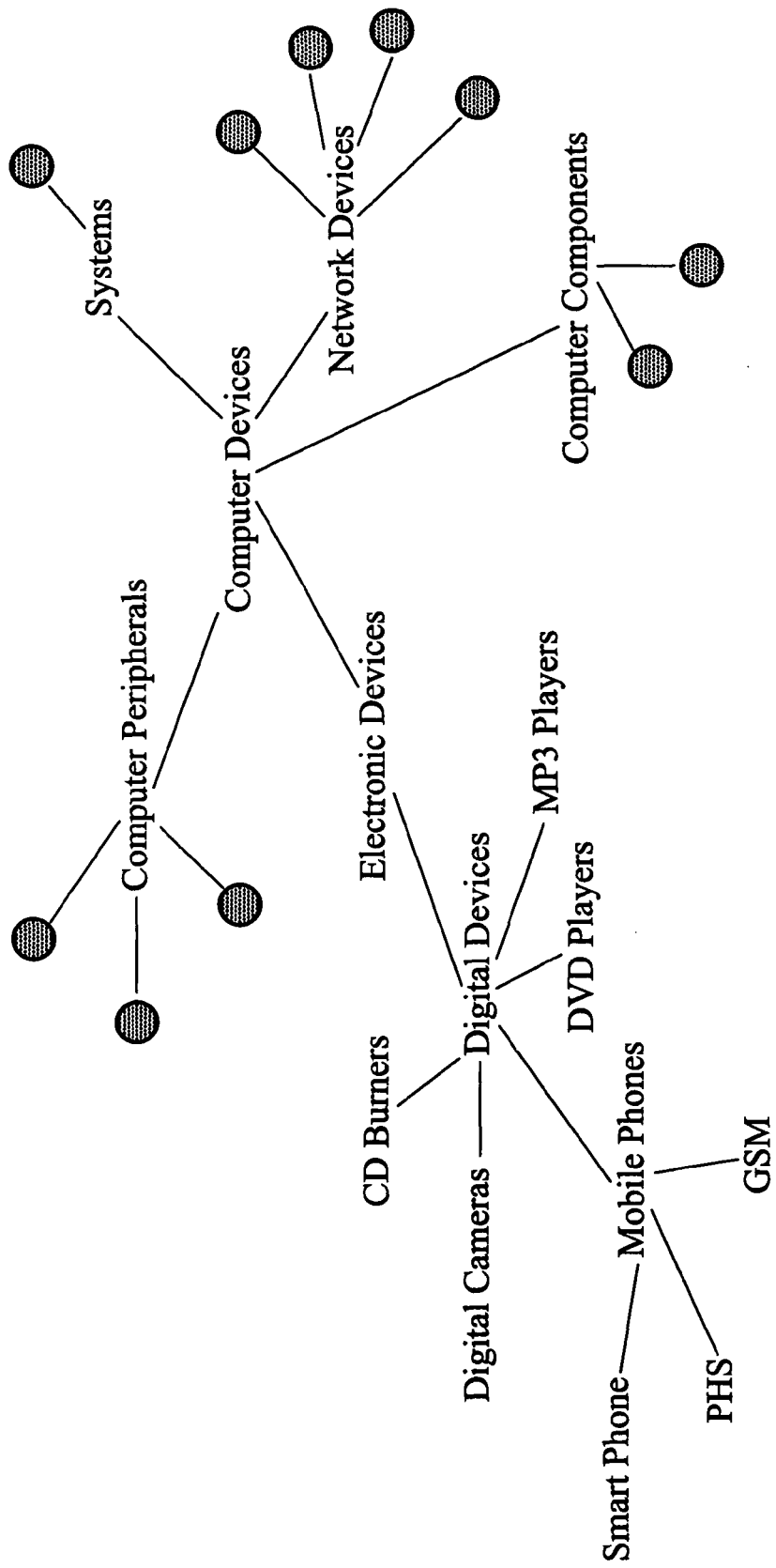
FIG. 2 is a schematic view of a tree structure of a domain model.

A dynamic event matching system 100 of the invention comprises an event client 110, a broker 120, and an event provider 130. Broker 120 further comprises a requirement retrieving module 121, a notification agent 123, a content-based matching module 125, and an event listener 127. A domain model 126 is first predefined in content-based matching module 125. Domain model 126 is a tree structure and is defined for a domain. As shown in FIG. 2, for example, a domain model for an information domain is defined, in which the root indicates computer devices, comprising a plurality of child nodes, comprising systems, network devices, computer peripherals, electronic devices, and the like. Each child node indicates a required item of a user and may comprise other child nodes. The electronic devices, for example, comprise a child node, digital devices, and the digital devices further comprise child nodes comprising CD burners, digital cameras, mobile phones, digital versatile disc (DVD) players, MP3 players, and others. The child node for the mobile phones further comprises child nodes comprising smart phones, personal handyphone systems (PHS), and global system for mobile communication (GSM).

Event client 110 defines filtering conditions of receiving dynamic events for users and models the filtering conditions as a context model 115. An electronic mail (email), for example, is sent to a user at a predetermined time (after 11:00 pm, for example) or when a mobile phone of the user is turned off. Further, a message is sent when the user cannot receive the phone and a mobile phone is used for communication when the user is free.

Event client 110 requests broker 120 to model retrieved requirements as a personal model 122, a tree structure as well as domain model 126. When broker 120 requests event from event provider 130 or event provider 130 actively generates and transmits dynamic events (web content, news reports, electronic papers, for example) to broker 120, and broker 120 receives the dynamic events through event listener 127. Event listener 127 models the dynamic events as an event model 128, a tree structure as well as domain model 126, and transfers event model 128 to content-based matching module 125. When event model 128 is received, content-based matching module 125 matches personal model 122 with event model 128 using domain model 126. If a required event is acceptable by event client 110, event model 128 is forwarded to event client 110 through notification 123, and event client 110 informs the user that the required event using a notification method defined in context model 115 has been received.

Figure 3:
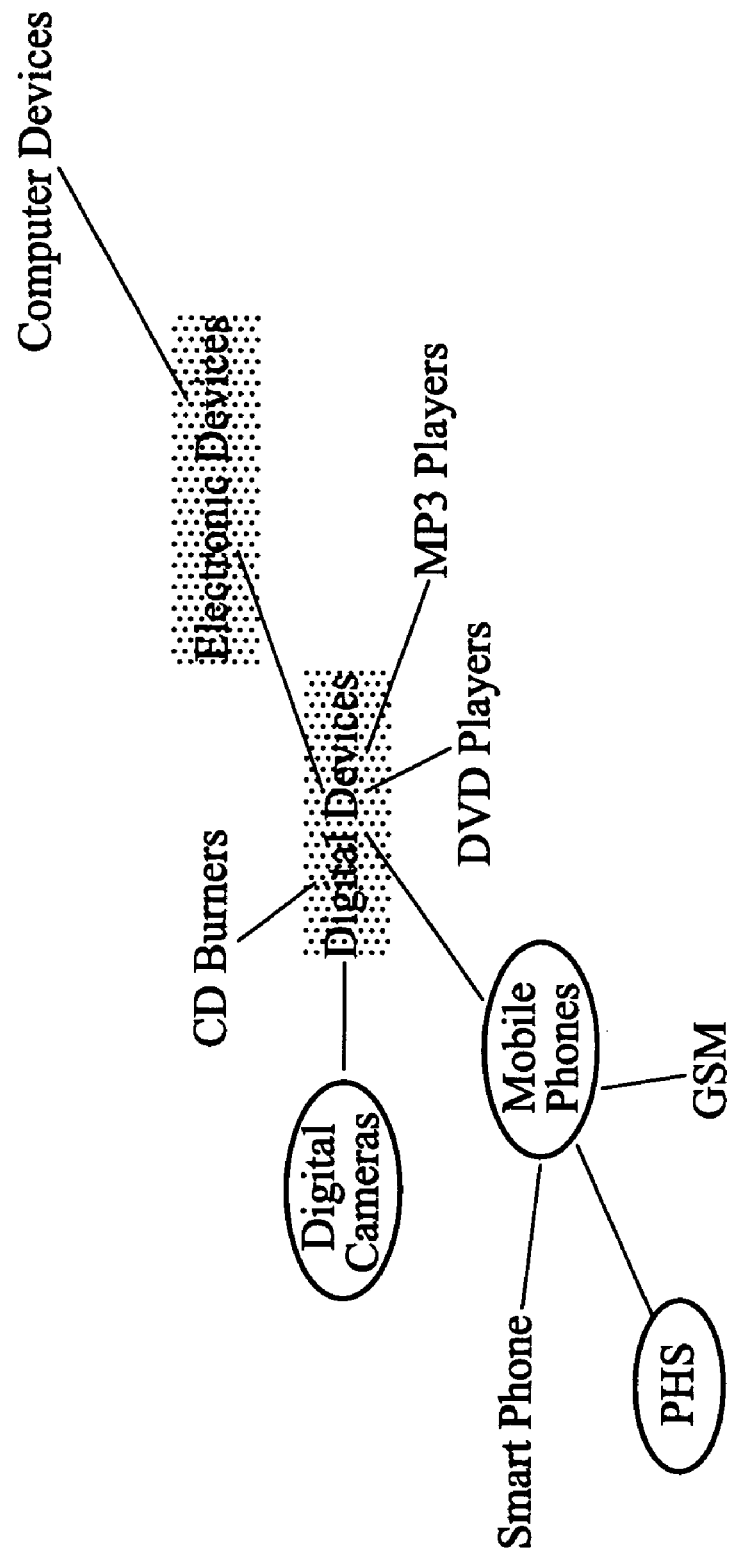
FIG. 3 is a workflow of an embodiment of event matching.

An example of a matching process is described in the following. A user desires to receive information relating to digital cameras and mobile phones, in which the digital camera conditions comprise display pixel greater than 7 megapixels, 5× optical zoom, and display size greater than 2.5 inches while mobile phone conditions comprise dual display, MP3 player, and internal memory greater than 4 megabyte. As shown in FIG. 3, when event provider 130 generates a dynamic event, content-based matching module 125 first determines whether the dynamic event relates to computer devices, and, if so, determines whether the dynamic event relates to digital cameras belonging to digital devices of electronic devices. If so, it is determined whether event content corresponds to the filtering conditions, and, if so, a message is sent to inform the user, and, if not, nothing happens. Additionally, content-based matching module 125 further determines whether the event content relates to mobile phones belonging to digital devices of electronic devices. If so, it is determined whether the event content correspond to the filtering conditions, and, if so, a message is sent to inform the user, and, if not, nothing happens.

Additionally, if the format of the event content does not correspond to the format acceptable by event client 110, broker 120 must transform the format of the event content to an acceptable format.

Figure 4:
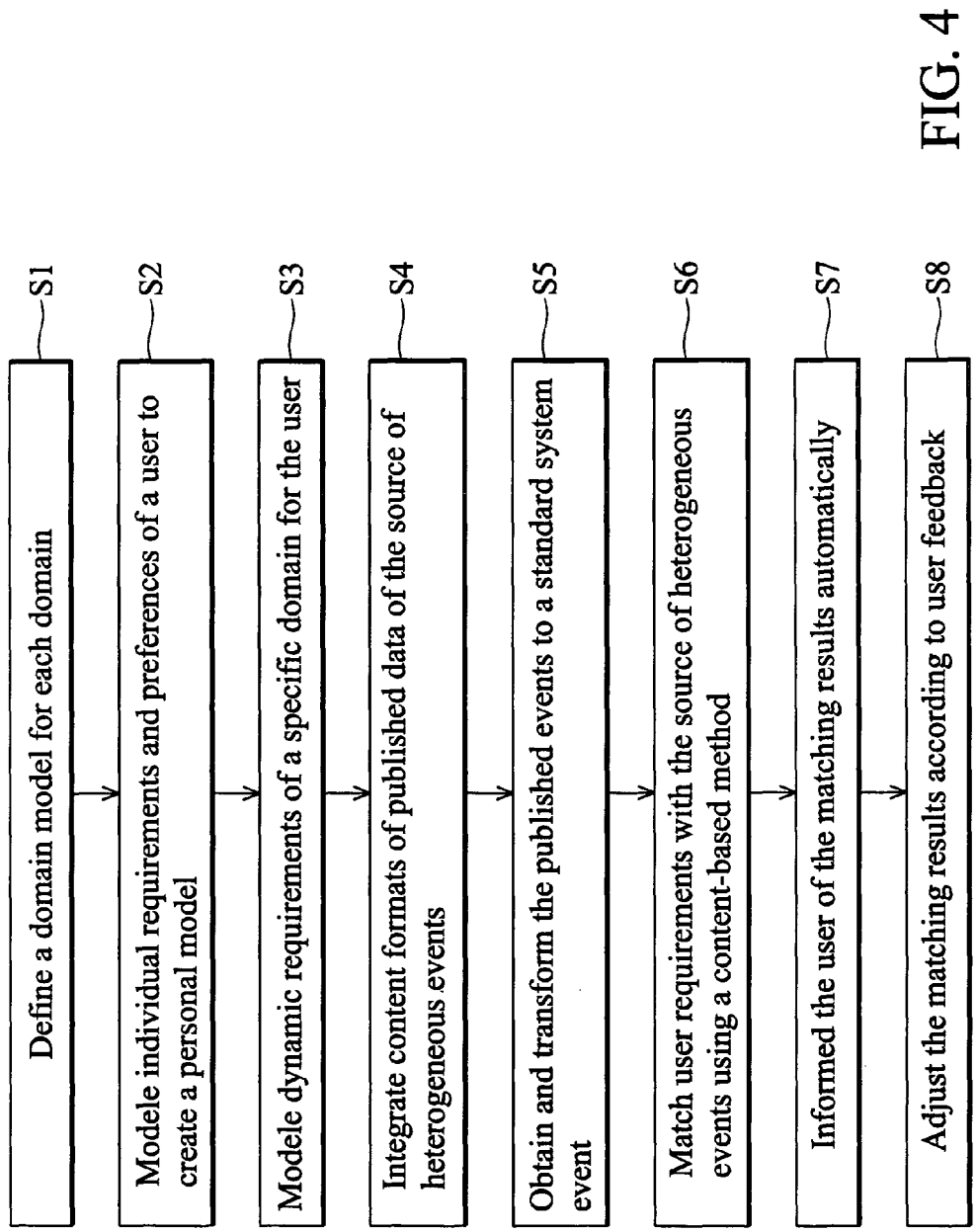
FIG. 4 is a flowchart of an embodiment of a method for dynamic event matching.

FIG. 4 is a flowchart of an embodiment of a method for dynamic event matching.

A domain model for each domain is first defined (as shown in FIG. 2) (step S1) and individual requirements and preferences of a user are modeled to create a tree-like personal model (step S2). As shown in FIG. 3, a user desires to receive information relating to digital cameras and mobile phones. Individual requirements and preferences of a user can be set using a web browser and an application wizard. Next, dynamic requirements of a specific domain for the user are modeled (step S3), as well as the filtering conditions for digital cameras and mobile phones. Content formats of published data of the source of heterogeneous events are integrated (step S4). Conversely, a dynamic event is generated by event provider 130. The format of the content published by event provider 130 correspond to a format acceptable by an information server (broker 120), is not corresponds to the format acceptable by the information server but correspondent with another structure format, or comprises uncertain data structure.

Figure 5:
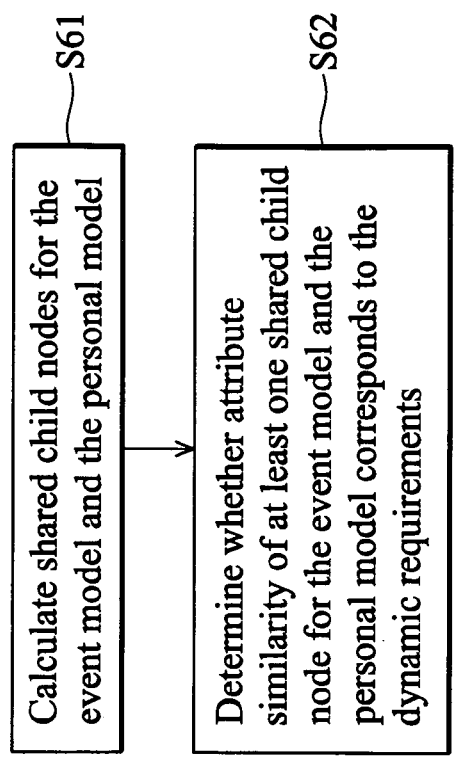
FIG. 5 is a flowchart of an embodiment of data format conversion shown in FIG. 4.

The information server obtains and transforms the published events to a standard system event acceptable by the user (step S5). The standard system event is a subclass of the domain model. The user requirements are matched with the source of heterogeneous events using a content-based method (step S6), further comprising calculating shared child nodes for the event model and the personal model (step S61, as shown in FIG. 5). It is noted that shared child nodes are provided by both the event model and the personal model and each shared child node does not comprise any child nodes. Additionally, it is determined whether attribute similarity of at least one shared child node for the event model and the personal model corresponds to the dynamic requirements (step S62, as shown in FIG. 5), and, if so, the user is notified. Next, the user is automatically informed of the matching results (step S7) and the matching results are adjusted according to user feedback (step S8).

An example of a matching process is illustrated based on the described steps.

A domain model for books is first defined, as shown in Attachment 1 (step S1). In this example, books can be classified to artificial intelligence (AI), games, and programming. Programming further comprises the Java language, comprising Java 2 Standard Edition (J2SE), Java 2 Enterprise Edition (J2EE), and Java 2 Micro Edition (J2ME). Next, a user logs in on a registration page to select J2SE and J2EE (step S2) and filtering conditions are set by publication of new books and a special discount of, or less than, 15 percent for cash (step S3). The setting of user preferences and dynamic requirements is shown in Attachment 2, thereby creating a personal model. When a book "Java Swing" is published, a message is printed on a web page (step S4). A matching system obtains and transforms the content to a specified format (step S5), indicating creating an event model, as shown in Attachment 3, and a matching process is implemented. The personal model is compared with the event model, indicating J2SE rules (user preferences) are compared with J2SE events (step S6). Based on the event model, "Java Swing" represents a new book and a discount of 15% is greater than the default setting of 10%, such that content relating to the event are automatically responded to the user. Additionally, current system time is at midnight and the notification is sent with an email instead of a short message (step S7). The user evaluates the system event with "Excellent" and the system implements an adjusting operation according to the estimation (step S8).

A method for dynamic event matching of the invention can improve accuracy of a matching process using a domain model that allows a user to set individual preferences and dynamic requirements (filtering conditions) for each item. The matching process is implemented to match user preferences with dynamic events to avoid irrelevant notifications. Additionally, a user can set different reception conditions for different notification modes, for example, different time.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for dynamic event matching, comprising:
defining a domain model for each domain, wherein the domain represents a set of common characteristics in a field and the domain model is a tree-based structure and comprises a plurality of nodes, wherein each of the nodes represents a required item for a user;

modeling individual requirements and preferences of a user to create a personal model, wherein the personal model is a tree-based structure and comprises a plurality of nodes, each representing a required item for the user;

modeling dynamic requirements of a specific domain for the user;

generating a dynamic event;

obtaining the dynamic event using an information server for format transformation to create an event model, wherein the event model is a tree-based structure and comprises a plurality of nodes, each representing a required item for the user;

matching the personal model and the event model using a content-based method according to the domain model and the dynamic event, wherein the matching further comprises: calculating shared child nodes for the event model and the personal model; determining whether attribute similarity of at least one shared child node for the event model and the personal model corresponds to the dynamic requirements; and if the attribute similarity corresponds to the dynamic requirements, sending a notification to the user;

informing the user of the matching results; and adjusting the matching results according to user feedback.

2. The method for dynamic event matching as claimed in claim 1, wherein shared child nodes are provided by both the event model and the personal model.

3. The method for dynamic event matching as claimed in claim 2, wherein a shared child node does not comprise any child nodes.

4. The method for dynamic event matching as claimed in claim 1, wherein content format of the dynamic event is correspondent with format which is acceptable by the information server.

5. The method for dynamic event matching as claimed in claim 1, wherein event transformation further comprises transforming the dynamic event to a standard system event acceptable by the user.

6. The method for dynamic event matching as claimed in claim 5, wherein the standard system event is a subclass of the domain model.

7. The method for dynamic event matching as claimed in claim 1, wherein content format of the dynamic event is not correspondent with the format which is acceptable by the information server but correspondent with another structure format.

8. The method for dynamic event matching as claimed in claim 1, wherein content format of the dynamic event comprises uncertain data structure.

9. A system for dynamic event matching, comprising:

an event client, capable of creating a personal model modeling according to individual requirements and preferences, wherein the personal model is a tree-based structure and comprises a plurality of nodes, each representing a required item for the user;

an event provider, capable of generating a dynamic event; and a broker, coupled to the event client and the event provided, capable of modeling dynamic requirements of a specific domain for the event client, wherein the specific domain represents a set of common characteristics in a specific field, further comprising: an event listener, obtaining the dynamic event from the event provider for format transformation to create an event model, wherein the event model is a tree-based structure and comprises a plurality of nodes, each representing a required item for the user;

a content-based matching module, providing a predefined domain model and matching the personal model and the event model using a content-based method according to the predefined domain model and the dynamic event, wherein the predefined domain model is a tree-based structure and comprises a plurality of nodes, wherein each of the nodes represents a required item for a user; and a notification agent, informing the user of the matching results and adjusting the matching results according to user feedback wherein the broker further calculates shared child nodes for the event model and the personal model, determines whether attribute similarity of at least one shared child node for the event model and the personal model corresponds to the dynamic requirements, and, if so, sends a notification to the event client.

10. The system for dynamic event matching as claimed in claim 9, wherein shared child nodes are provided by both the event model and the personal model.

11. The system for dynamic event matching as claimed in claim 10, wherein a shared child node does not comprise any child nodes.

12. The system for dynamic event matching as claimed in claim 9, wherein content format of the dynamic event is correspondent with format which is acceptable by the information server.

13. The system for dynamic event matching as claimed in claim 9, wherein the broker further comprises transforms the dynamic event to a standard system event acceptable by the user.

14. The system for dynamic event matching as claimed in claim 13, wherein the standard system event is a subclass of the domain model.

15. The system for dynamic event matching as claimed in claim 9, wherein content format of the dynamic event is not correspondent with the format which is acceptable by the information server but correspondent with another structure format.

16. The system for dynamic event matching as claimed in claim 9, wherein content format of the dynamic event comprises uncertain data structure.

* * * * *